A. W. KELLY & J. HORNYAK.
SLIDE RULE.
APPLICATION FILED NOV. 7, 1913.
1,210,488.
Patented Jan. 2, 1917.
2 SHEETS—SHEET 1.
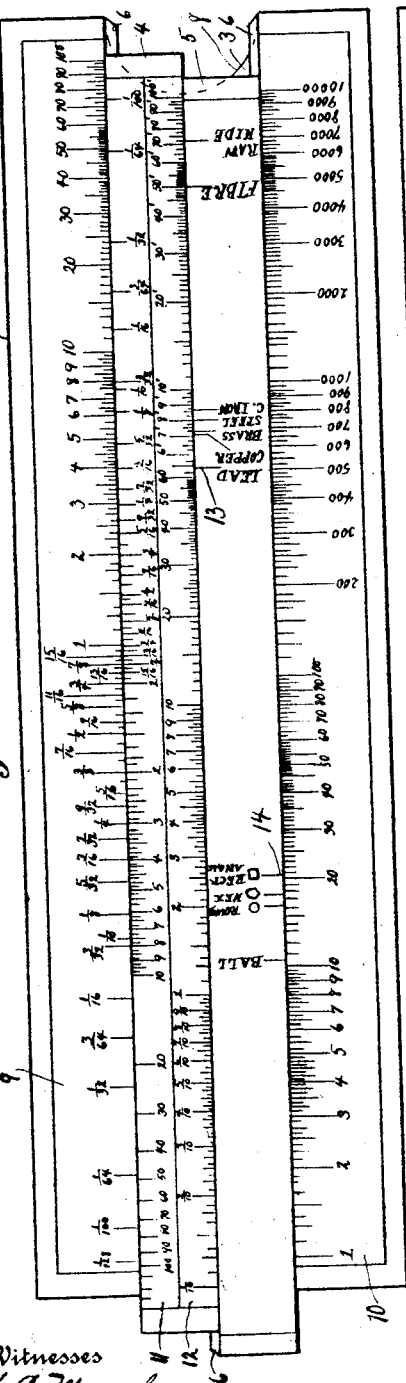
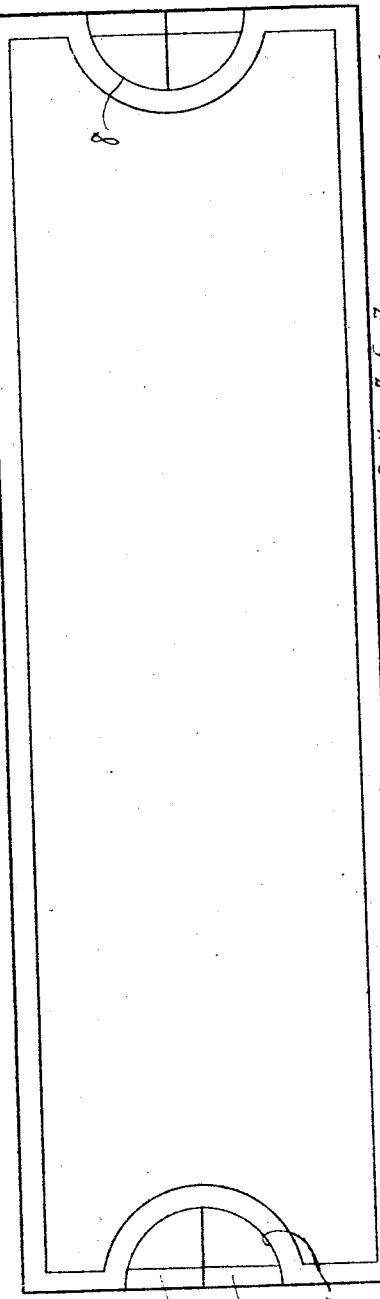
Inventors
Andrew W. Kelly
John Hornyak
By W. W. Williamson
Attorney
Witnesses
S. C. Myers
H. W. Burton

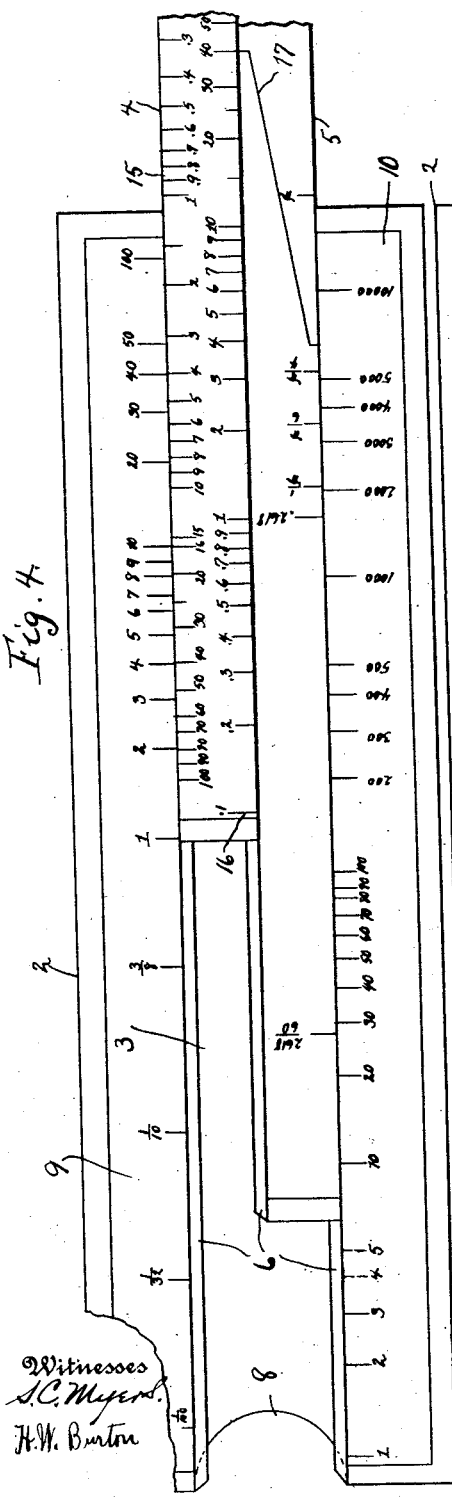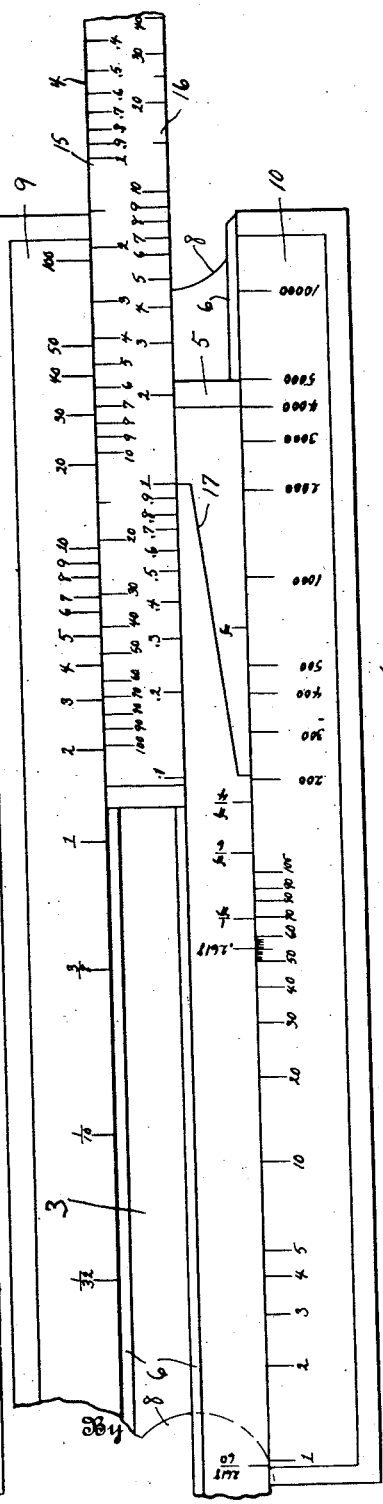

UNITED STATES PATENT OFFICE.

ANDREW W. KELLY AND JOHN HORNYAK, OF PHILADELPHIA, PENNSYLVANIA.

SLIDE-RULE.

1,210,488.   Specification of Letters Patent.   Patented Jan. 2, 1917.

Application filed November 7, 1913. Serial No. 799,756.

*To all whom it may concern:*

Be it known that we, ANDREW W. KELLY and JOHN HORNYAK, residing at Philadelphia, in the county of Philadelphia and State of Pennsylvania, have invented new and useful Improvements in Slide-Rules, of which the following is a specification.

Our invention relates to new and useful improvements in slide rules, and has for its object to provide an exceedingly simple and effective device of this character, whereby the weight of any object which increases its weight uniformly may be obtained when given the measurements of the object.

Another object of the invention is to provide means for finding the time consumed in making a cut in a lathe or the solution of other equations, and any desired constant may be placed upon the slides and certain ones added, especially those which are used for the particular work of the operator or owner of the rule.

A still further object of the invention is to provide 2 fixed scales with which co-act 2 slides, one of which is provided with 2 scales on each side, another with certain constants on both sides relating to different forms of cross sections, as well as those relating to distance, speed, etc.

With these ends in view, this invention consists in the details of construction and combination of elements hereinafter set forth and then specifically designated by the claims.

In order that those skilled in the art to which this invention appertains may understand how to make and use the same, we will describe its construction in detail, referring by numeral to the accompanying drawing forming a part of this specification, in which—

Figure 1, is a plane or face view of my improved slide rule, showing the slides in position for finding the weight of any regular object, the material and dimensions of which are known. Fig. 2, is a back or reverse face view thereof. Fig. 3, is an end view thereof. Fig. 4, is a face view thereof showing the slides reversed and in the position for the first operation of obtaining the time for making a cut in a lathe; and Fig. 5, is a similar view showing the slides in the last position when solving the problem referred to in Fig. 4.

In carrying out our invention as illustrated in Figs. 1 to 3 inclusive, 2 represents the frame or body of the rule having a longitudinal recess 3 in one of its faces, in which are fitted to slide the slides 4 and 5, being held in place by tongues 6 which register with the grooves 7.

In order that the slides 4 and 5 may be readily operated, a notch or cutaway portion 8 is formed in the back of the body at each end.

On the front face of the body are provided two fixed logarithmic scales 9 and 10 intermediate of which are mounted the slides 4 and 5. The slide 4 has marked on one face two logarithmic scales 11 and 12, so that we have on the scales 9, 11 and 12 the three dimensions of a mass or object, the scale 9 representing the thickness, the scale 11 the width, and the scale 12 the length. The slide 5 has a number of constants represented upon one face and designated by the numerals 13 and 14. The constants 13 denote the kind of material in the mass and are laid out according to the specific gravity of the mass. Said constants are situated upon one edge of the slide, while the other constants 14 are situated upon the opposite edge and represent the shape of the mass or object in cross section. Of course it is to be understood that any number of constants may be used, only a small number being here represented for convenience of explanation. The other fixed scale 10 represents the weight of the mass or object in pounds.

In order to find the weight of a given object, the slide 4 is moved until the figure upon the scale 11 representing the width of the object is brought opposite to the figure upon the scale 9 representing the thickness, after which the slide 5 is moved until the point designating the kind of material from which the object is made registers with a figure upon the scale 12 which represents the length of the object and when the slides are in the desired position the weight in pounds will be found upon the scale 10, said weight being represented by the figure upon said scale 10, which is in registration with the constant 14 representing the cross section or shape of the object.

In practice to find the weight of a piece of steel 3 inches thick, ¼ of an inch wide and 8 feet long, the slides 4 and 5 are moved to the positions shown in Fig. 1, at which time the numeral ¼ on the scale 11 registers with the numeral 3 on the scale 9, and the constant "steel" registers with the numeral 8 on the scale 12 representing feet, thus giving the weight of the object upon the scale 10 opposite the rectangular constant, showing that said object will weigh approximately 20½ pounds. If this had been an oval shaped object in cross section, the weight thereof would have been found under the round constant, and would show that such object weighs approximately sixteen pounds.

In Figs. 4 and 5 we have shown the reverse faces of the slides 4 and 5. The reverse face of the slide 4 is similar to its front face, having identical scales 15 and 16 thereon, but the reverse face of the slide 5 is provided with certain constants which differ from the ones upon its front face, and these constants are adjacent one edge only, and said reverse face of the slide 5 is further provided with a "Z" line 17, the ends of which terminate at opposite edges of the slide 5.

In Figs. 4 and 5 we have illustrated the positions of the slides. When the slides are moved to such a position that a numeral on scale 15 registers with a numeral on the scale 9 and the top of the "Z" line registers with a numeral on the scale 16, the bottom of the Z line will register with the product of the numbers. In practice to solve the equation $10 \times 16 \times 40 \times .2618 = 1675+$, the scale 15 is moved until the numeral 16 thereon registers with the numeral 10 on the scale 9, and the top of the Z line on the slide 5 registers with the numeral on the scale 16; then the numeral upon the scale 10 in registration with the constant .2618 on the bottom edge of the slide 5 is the product or result which in this case is 1675+, as shown in Fig. 4.

In Fig. 5 is shown the result of dividing the above product by 30 or solving the equation $$\frac{10 \times 16 \times 40 \times .2618}{30} = 55+.$$

Proceed as above until the product of $10 \times 16 \times 40 \times .2618$ is reached. Then hold the slide 5 in this position and move the slide 4 until the numeral 30 on the scale 16 registers with the top of the Z line (this operation not being shown). After the parts are in this position, then hold the slide 4 stationary and move the slide 5 until the top of the Z line registers with the numeral upon the scale 16. Then by looking at the numeral on the scale 10 under the constant .2618 on the slide 5, the product or result may be ascertained, which in this case is .55+.

The different slides may be provided with any number of different constants and some may be arranged on one face and some on the other face thereof as shown for the slide 5 in Figs. 1 and 5, said slide as shown in Fig. 5 being reversed to the position shown in Fig. 1. The constants shown upon the different scales are not all used in any one equation, but certain of them are used at one time, and others at another time, and then again the constants on one face of one of the slides are used for solving one portion of an equation, and the constants on the other side are used for solving the balance of the equation.

An example of the use of both sides of the slides 4 and 5 is:—find the price of ten bars of steel 3 inches thick, one quarter inch wide and 8 feet long at three cents per pound.

To solve the above example upon the slide rule, the slides 4 and 5 are moved to the positions shown in Fig. 1, at which time the numeral ¼ on the scale 11 registers with the numeral 3 on the scale 9, and the constant "steel" registers with the numeral 8' on the scale 12 representing feet, thus giving the weight of the object upon the scale 10 opposite the rectangular constant, showing that said object will weigh approximately 20½ pounds. After finding the weight of one bar as above, the slides 4 and 5 are reversed and the slide 4 moved until the numeral 10 on the scale 15, denoting the number of pieces, registers with the numeral or indication representing 20½ pounds, or the weight of one piece, on the scale 9, then the slide 5 is moved until the upper end of the Z line registers with the numeral 3 on the scale 16, representing the price per pound, at which time the opposite or lower end of the Z line registers with the numeral or indication for 61.5 on the scale 10 which is the price in cents for the entire lot. This last operation is not shown on the drawings, but only denotes a different position of the slides from that shown in Figs. 4 and 5.

Of course we do not wish to be limited to the exact details of construction as here shown as these may be varied within the limits of the appended claims without departing from the spirit of our invention.

Having thus fully described our invention, what we claim as new and useful, is—

1. A slide rule comprising a body, a pair of slides mounted within said body, a scale on said body advancing toward the right, a similar scale advancing toward the left on one of said slides, coacting with the first named scale, another scale on said slide, another scale on the body, and a constant scale on the other slide coacting with the last two named scales.

2. A slide rule comprising a body, a pair of slides mounted within said body, a scale on said body advancing toward the right, a similar scale advancing toward the left on one of said slides coacting with the first named scale, another scale on said slide, a constant scale on the other slide, a Z line on said other scale, and another scale on the body coacting with the constant scale and with one end of said Z line.

In testimony whereof, we have hereunto affixed our signatures in the presence of two subscribing witnesses.

ANDREW W. KELLY.
JOHN HORNYAK.

Witnesses:
 JOSEPH SZAFKA,
 R. RAYMOND PORTER.